United States Patent [19]

Watanabe

[11] 4,107,489
[45] Aug. 15, 1978

[54] SWITCH MECHANISM FOR SIMPLE PHONOGRAPH

[75] Inventor: Katsumi Watanabe, Kawasaki, Japan

[73] Assignee: Yugen Kaisha Watanabe Kenkyusho, Japan

[21] Appl. No.: 687,692

[22] Filed: May 19, 1976

[30] Foreign Application Priority Data

May 21, 1975 [JP] Japan ............................ 50-68132[U]

[51] Int. Cl.² ...................... H01H 35/00; G11B 3/00; H01H 3/00
[52] U.S. Cl. ......................... 200/52 R; 200/DIG. 34; 274/1 A; 274/9 R
[58] Field of Search .................. 274/1 R, 1 A, 1 D, 7, 274/9 R, 1 F; 200/52 R, 61.58 R, 61.62, 61.7, 262, 267, 270, 52; 192/123, 124

[56] References Cited

U.S. PATENT DOCUMENTS

| | | | |
|---|---|---|---|
| 2,300,209 | 10/1942 | DeTar | 192/124 |
| 2,458,623 | 1/1949 | Mortimer | 274/1 D |
| 3,035,141 | 5/1962 | Goral | 200/267 X |
| 3,467,393 | 9/1969 | Kuwayama | 274/1 F X |
| 3,633,923 | 1/1972 | Watanabe | 274/1 A X |
| 3,773,331 | 11/1973 | Watanabe | 274/1 A X |
| 3,823,946 | 7/1974 | Nakajima | 274/1 A X |

*Primary Examiner*—James R. Scott
*Attorney, Agent, or Firm*—Basile and Weintraub

[57] ABSTRACT

A switch mechanism for a phonograph disposed in an openable and closable casing having a movable contact piece and a pivotally movable pick-up bracket. The contact piece, which is in electrical communication with a source of power, is moved by a pivotally movable pick-up bracket to break the electrical circuit. The switch mechanism, also, includes a switch actuator which pushes the contact piece from the same direction as the pick-up bracket. A pawl is mounted onto the casing and is movable therewithin. When the casing is closed, the pawl pushes the switch actuator away from the contact piece to permit the circuit to be closed.

5 Claims, 5 Drawing Figures

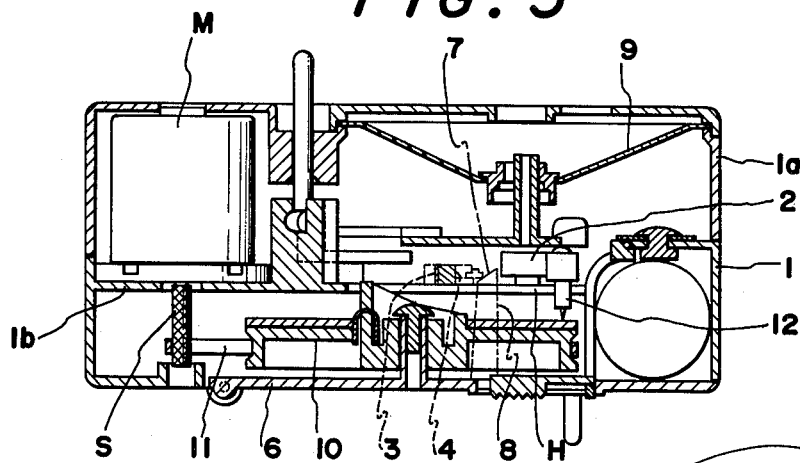
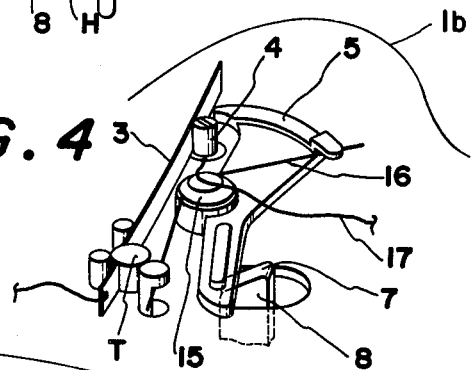
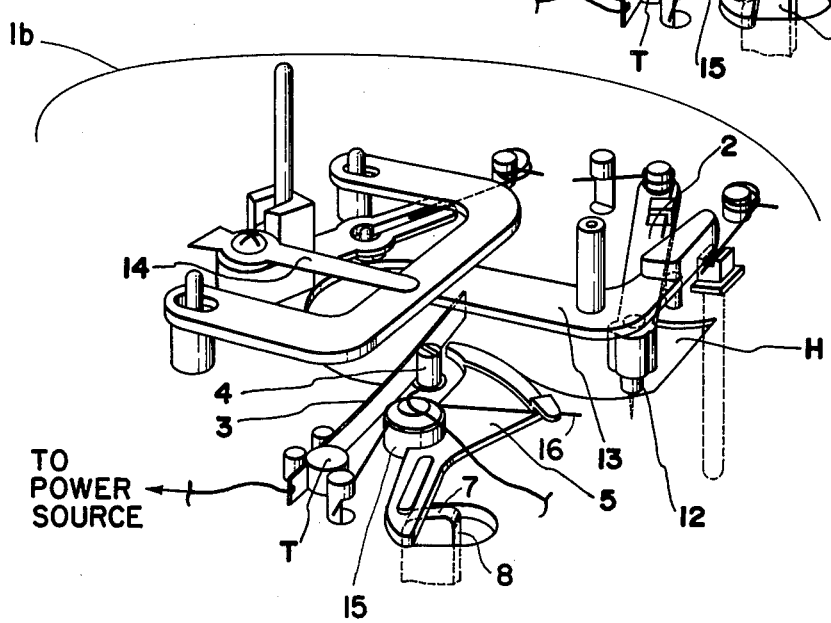

SWITCH MECHANISM FOR SIMPLE PHONOGRAPH

BACKGROUND OF THE INVENTION

1. Field of the Invention

The present invention relates to a switch device for use in a simple-structured phonograph, and more particularly to a switch mechanism for a simple-structured phonograph wherein all the contact members in the switch mechanism are assembled in a lot to minimize the electrical loss at every switch operation.

2. Prior Art

In the commercially marketed simple phonographs of the type in which the turntable is automatically stopped when the pickup bracket reaches the end of the recording or playback stroke, or when the opening and closing flap of the casing is opened, there is provided a switch device comprising an operating mechanism for disconnecting the power from the motor by the pickup bracket and a mechanism for connecting the power to the motor with closure of said flap of the casing. Such switch device, therefore, has two separate contact assemblies. Thus, the prior art assemblies are complicated in structure. Furthermore, they suffer great electrical losses, resulting in adverse effects to the revolving performance of the motor. Also, these types of simple phonographs are usually used as sound-producing devices for talking or sounding toys. However, in such applications the phonograph must have sufficient strength to withstand rough handling by children, and it is, also, highly desirable that such devices be manufactured at low cost. However, the moveable contact elements provided in the electrical circuit for such prior art devices are very delicate structurally and, hence, are vulnerable to easy breakdown. It is, therefore, very desirable to minimize the number of such contact elements necessitated in the device. It would, also, be advantageous if such contact elements could be assembled all together, at one location, thereby simplifying the manufacturing process of the device, as well as significantly reducing the cost of manufacture.

The present invention provides a solution to such problems in said type of the conventional simple phonographs.

OBJECTS OF THE INVENTION

An object of the present invention is to simplify the switch mechanism for use in a simple phonograph.

Another object of this invention is to provide a switch mechanism in which the contact elements are assembled in a lot to minimize the electrical loss.

Still another object of this invention is to provide a switch mechanism which operates to energize the circuit when the casing is closed, while breaking the circuit when the casing is opened, and which also operates to disconnect the power when the pickup bracket reaches the end of its pivotal movement.

SUMMARY OF THE INVENTION

In accordance with the present invention, there is provided a switch device for a simple phonograph comprising: a casing which houses a switch mechanism. The switch mechanism is responsive to the movement of a pivotally movable pick-up bracket disposed within the casing. The switch mechanism includes a movable contact piece which extends to the terminal end of the pick-up bracket and a fixed contact piece against which the movable piece bears to maintain a closed electrical circuit. A switch actuator interrupts contact between the fixed and movable contact pieces to break the electrical circuit when the pick-up bracket reaches the end of its path of travel. A tapered pawl element is mounted onto an opening and closing flap of the casing. When the flap is closed, the pawl element pushes the switch actuator away from its interrupting position to thereby effectuate contact between the fixed and movable contact pieces.

The moveable contact piece performs a double function. One function is for disconnecting the power from the motor to stop rotation of the turntable automatically upon arrival of the pickup bracket at the end of its swinging movement, i.e., at the end of the recording or playback stroke. Also, the contact piece automatically breaks the power circuit to the motor to stop the turntable when the opening and closing flap or back cover of the casing is opened for exchange of power cells or for other purposes.

According to the present invention, the mechanism for operating the switch contact elements by the pickup bracket and the mechanism operated by opening or closing of the back cover of the casing are assembled in a lot. This allows a saving in time and labor in manufacture, as well as, a sizable reduction of electrical loss to eliminate the risk of baneful effect to the revolving performance of the motor. Further, the delicate working parts are simplified to improve durability of the device.

For a more complete understanding of the present invention, reference is made to the following detailed description and accompanying drawing. In the drawing like reference characters refer to like parts throughout the several views, in which:

BRIEF DESCRIPTION OF THE DRAWING

FIG. 3 is a vertical sectional view taken along a plane substantially bisecting the body of the phonograph shown in FIG. 1;

FIG. 4 is a perspective view of the switch mechanism, and

FIG. 5 is a perspective view of the pickup bracket assembly.

DETAILED DESCRIPTION OF THE PREFERRED EMBODIMENT

The present invention, as noted, comprises a combination or arrangement wherein the end of a moveable contact piece is elastically urged in the direction opposed to the swinging motion of a pickup bracket. Thus, the moveable contact normally stays in contact with a fixed contact piece which is positioned at the terminal end of the swinging or pivotally moveable pickup bracket, i.e., the terminus of the recording or playback stroke. Thus, when the pickup bracket arrives at the end of its swinging movement, the moveable contact piece is pushed to separate from the fixed contact piece by the thrust of one end of the pickup bracket. The present invention, also, comprises an upstanding or erect, inwardly directed pawl element on the opening and closing flap or back cover of the casing. When the back cover is closed the pawl element pushes the switch actuator to let it move away from the moveable contact piece with the fixed contact piece to again energize or power the circuit.

More specifically, the present invention comprises a casing which houses a switch mechanism. The switch mechanism is responsive to the movement of a pivotally movable pick-up bracket disposed within the casing. The switch mechanism includes a movable contact piece which extends to the terminal end of the pick-up bracket and a fixed contact piece against which the movable piece bears to maintain a closed electrical circuit. A switch actuator interrupts contact between the fixed and movable contact pieces to break the electrical circuit when the pick-up bracket reaches the end of its path of travel. A tapered pawl element is mounted onto an opening and closing flap of the casing. When the flap is closed, the pawl element pushes the switch actuator away from its interrupting position to thereby effectuate contact between the fixed and movable contact pieces.

Figure 1:
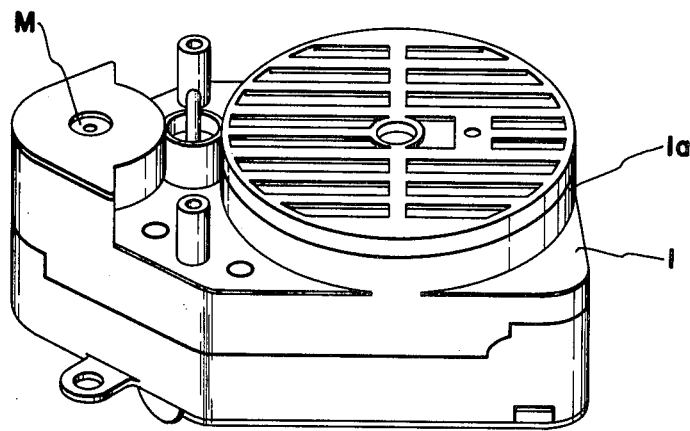
FIG. 1 is a perspective view of a simple phonograph incorporating the device of the present invention.

Referring now to the drawing and, in particular, to FIGS. 1 and 3, a casing 1 has a speaker jacket 1a housing a speaker cone 9 therein. A panel 1b is formed in the middle of the interior thereof. The casing, also, includes an opening and closing flap or back cover 6. The back cover 6 pivotally supports a turntable 10 inwardly thereof. A pulley or belt groove is formed in the periphery of the turntable 10. An endless belt 11 extends from around the groove and around a shaft S of a motor M. The motor M is fixedly mounted on the panel 1b of the casing 1.

The pawl element 8 is disposed on the interior side of the back cover 6 and extends upwardly therefrom into the interior of the casing 1, when the back cover is closed.

Figure 2:
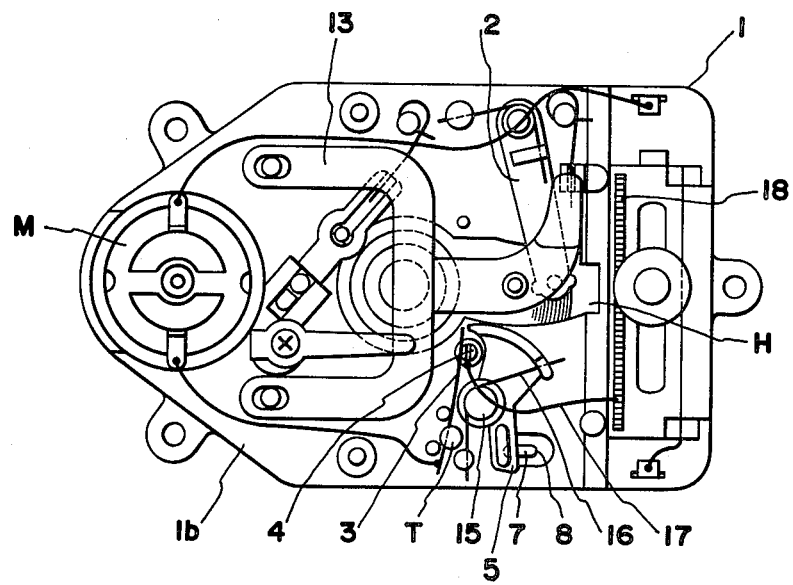
FIG. 2 is a plan view thereof with the top cover removed.

Pivotally mounted on the panel 1b is a pickup bracket 2. The bracket 2 is disposed such that a pickup 12 at one end thereof, is, rotatingly moveable toward the center of the turntable 10. The panel 1b, as particularly depicted in FIGS. 2 and 5 is, also, formed with an elongated slot H which extends from an upper part to a lower part of the casing 1 along the locus of the swinging movement of the pickup 12. Thus, the pickup 12 is rotatingly moveable from the peripheral edge toward the center of the turntable 10. Accordingly, the terminus of the rotating movement of the pickup 12 is located close to the center of the turntable 10, or a record disc (not shown) mounted on the turntable.

Also, mounted on the panel 1b is an elastic guide bar 13. The guide bar 13 urges the pickup bracket 2 toward the turntable 10. The guide bar 13 is pressed or biased by a leaf spring 14 toward the turntable 10. A moveable contact piece 3 (FIGS. 3, 4 and 5) is mounted on the panel 1b. The contact piece 3 is made of an elastic metal material to enable it to flex and it extends into the path of the end of the track of swinging movement of the pickup 12 at the end of the pickup bracket 2 (FIG. 5). The moveable contact piece 3 is secured at one end thereof to the panel 1b by a terminal T. The terminal T is mounted on the panel 1b. The other end of the contact piece 3 is pressedly contacted and biassed against a fixed contact piece 4 which protrudes on the panel 1b. The moveable contact piece 3 may be biassed or pressed by using a separate biasing or pressing means. Also, the contact piece 3 may be made from an elastic plastic plate having its surface plated or deposited with an electroconductive metal.

Referring to FIGS. 2 and 4, erected on the panel 1b is a pivotal shaft 15 to which a switch actuator 5 is pivotally secured. The switch actuator 5 is pivotally swingable about the shaft 15 along the surface of panel 1b. The switch actuator 5 is constantly pressed or biased by a spring 16 to push the moveable contact piece 3 against its elastic force to urge its separation from the fixed contact. The switch actuator 5 is supported at its other end or the end opposite from its end pushing the moveable contact piece 3, by the tapered end of the pawl element 8 which, as noted, is erected inwardly on the opening and closing flap or back cover 6.

The pawl element 8 is so designed that its tapered end projects out above the panel 1b from a hole formed in the panel 1b so as to support the switch actuator 5 against the pressed direction thereof. Thus, when the back cover 6 is closed, the switch actuator 5 is kept separate from the moveable contact piece 3, as shown in FIGS. 2 and 4, so that the moveable contact piece 3 is elastically contacted with the fixed contact 4 to maintain the closed-circuit condition.

A lead wire 17 (FIGS. 2 and 4) extends to a power supply which includes a variable resistor 18 to power or energize the circuit. The power supply is in electrical communication with the motor M, in the well-known manner.

When the back cover 6 is opened, the pickup 12 is unable to contact the turntable 10 and no sound reproduction is accorded.

Having, thus, described the invention, what is claimed is:

1. A switch mechanism for use in a simple phonograph, comprising:
    (a) a casing having an opening and closing flap;
    (b) a pivotally moveable pickup bracket which travels along a path coincident from the peripheral edge to the center of a turntable of the phonograph;
    (c) a moveable contact piece extending into the path of the terminal end of the pivotal movement of the pickup bracket, said contact piece being biased against the direction of movement of said pickup bracket toward the terminal end thereof;
    (d) a fixed contact member against which said moveable contact piece is biased and supported;
    (e) a pivotally moveable switch actuator elastically biassed such that one end thereof thrusts out the free end of said moveable contact piece against its elastic forces so as to break the contact thereof with the fixed contact member, and
    (f) a pawl element disposed on the opening and closing flap of the casing and projecting inwardly into the interior of the casing, the pawl element having a tapered end so that when the casing is closed said tapered end of said pawl element pushes the switch actuator such that the switch actuator is axially displaced away from the switch upon the engagement of the actuator with the pawl when the flap is closed.

2. A switch mechanism for use in a simple phonograph according to claim 1, wherein:
    the moveable contact piece is made of an elastic electroconductive material so that said contact piece is biased into contact with the fixed contact member by its own elastic force.

3. A switch mechanism for use in a simple phonograph according to claim 2, wherein:
    said moveable contact piece is formed from a plastic plate having an electroconductive material deposited thereon.

4. A switch mechanism for use in a phonograph of the type comprising a casing having an opening and closing flap, a turntable disposed in the casing, a pickup bracket which travels along a path associated with the turntable, first switch means for stopping the turntable when the pickup reaches the end of the recording or playback stroke, the first switch means comprising a moveable contact piece extending to the terminal end of the swinging movement of the pickup bracket, said contact piece being biased against the direction of movement of said pickup bracket toward the terminal end thereof, a fixed contact member against which said moveable contact piece is pressed and supported, second switch means for stopping the turntable when said casing is opened, said second switch means comprising a pawl element disposed on the opening and closing flap and being inwardly directed, the inner end of the pawl element actuating a switch actuator, the switch actuator being responsive to the opening of the flap to render said second switch means operable, the switch mechanism being characterized in that:

(a) said moveable contact piece and said fixed contact member cooperate to comprise said second switch means, (b) said switch actuator is pivotally mounted in the casing, the actuator being biassed such that one end thereof is capable of moving the moveable contact piece against its bias to break its contact with the fixed contact member, and (c) said inner end portion of said pawl element is tapered for transforming the movement of said pawl element into a movement of said switch actuator for moving the actuator into and out of engagement with the moveable contact piece by the axial displacement thereof upon the closing of the flap.

5. The switch mechanism according to claim 4 characterized in that:

(a) said switch actuator comprises a swinging lever, the lever moving in a plane substantially parallel to the place of movement of the pickup bracket, and (b) said pawl element is moveable in a plane perpendicular to the plane of movement of the lever.

* * * * *